Aug. 17, 1954 W. E. A. RUSKA 2,686,454
REFRACTOMETER CELL
Filed June 22, 1951 2 Sheets-Sheet 1

INVENTOR:
Walter E. A. Ruska
BY
Murray Robinson
ATTORNEY.

Aug. 17, 1954 — W. E. A. RUSKA — 2,686,454
REFRACTOMETER CELL

Filed June 22, 1951 — 2 Sheets-Sheet 2

INVENTOR:
Walter E. A. Ruska
BY
Murray Robinson
ATTORNEY.

Patented Aug. 17, 1954

2,686,454

UNITED STATES PATENT OFFICE 2,686,454

REFRACTOMETER CELL

Walter E. A. Ruska, Houston, Tex.

Application June 22, 1951, Serial No. 233,030

4 Claims. (Cl. 88—14)

This invention pertains to refractometers and more particularly to a recording differential refractometer used to measure the condition of a fluid compared to a standard fluid.

It is a principal object of the invention to provide such an apparatus which will be much more accurate than previously known apparatus of the same type enabling it to be used to monitor processes which heretofore could be accurately controlled only with other more expensive apparatus.

It is a further object of the invention to provide such an apparatus which can easily be adapted to varying conditions of use.

A further object of the invention is to provide such an apparatus that is inexpensive to manufacture and maintain and which is simple and reliable in operation.

For a detailed description of a preferred embodiment of the invention reference will now be made to the accompanying drawings wherein.

Figure 1:
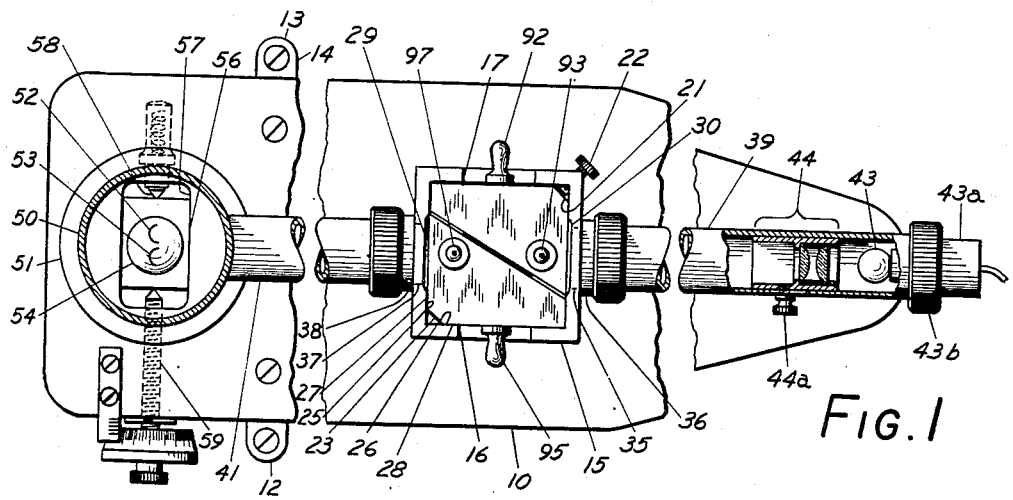
Figure 1 is a top view thereof.
Figure 2:
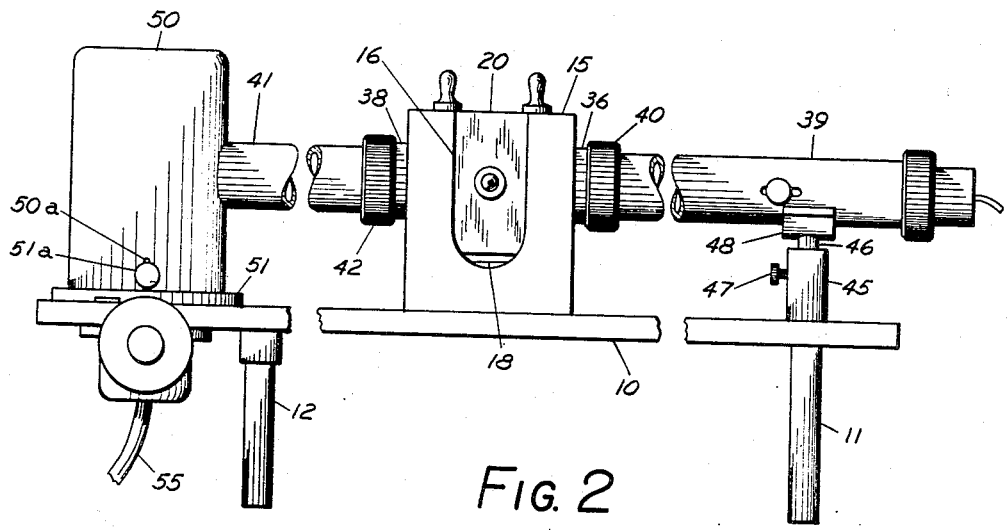
Figure 2 is a front elevation of an apparatus embodying the invention.

Referring first to Figures 1 and 2 there is shown a supporting means comprising a flat topped plate 10 having single leg 11 at its right end end and a pair of legs 12 and 13 at its left end secured to a cross member 14 which in turn is fastened to plate 10. The plate is generally rectangular at its left end and central portion but tapers down at its right end to a narrower width.

Near the center of the top of the plate 10 there is secured a means to hold the refractometer cell which comprises a square frame 15 having a pair of U-shaped slots 16 and 17 in its sides. Near the bottom of the frame is a pair of thin plates such as that shown at 18. A cell 20 is placed in the frame resting on the plates. The cell 20 is of generally square horizontal cross section and is bevelled at 21 to engage a set screw 22 passing through one corner of frame 15. The diagonally opposite edge of the cell is also bevelled at 23 to enable the faces 25 and 26 of the cell to rest flat against the opposing perpendicular faces 27 and 28 of the corner of frame 15. The sides of the frame are relieved at 29 and 30 to insure proper seating of the cell. The cell is thus held in the frame at three places, the two angularly disposed faces of the corner of frame 15 and the flat end of screw 22 directed toward the apex of the angle between the two faces. By mounting the cell in this manner it can be easily removed and replaced in the same position with respect to orientation and location in the horizontal plane.

There is an opening 35 in frame member 15 and a short tube 36 extends outwardly to the right around the opening. There is a similar opening 37 in frame member 15 surrounded by a short tube 38. A light tube 39 is secured to tube 36 by a screw coupling 40 and a light tube 41 is secured to tube 38 by a screw coupling 42. At the other end of light tube 39 is a source of parallel light comprising a small electric lamp 43 and a collimating lens system designated generally at 44. Lamp 43 is mounted in a socket member 43a which is secured to tube 39 by a screw coupling 43b. The collimating lens system 44 is slidable in tube 39 and may be locked in the desired position of adjustment by means of screw 44a. The tube 39 is supported by pedestal comprising a sleeve 45 secured to plate 10 and a rod 46 clamped therein by set screw 47. The top of rod 46 is integral with a reinforcing plate 48 attached to the light tube. The light tube and light source can easily be removed by unscrewing coupling 40.

The left end of light tube 41 is connected to an inverted cup shaped cover 50 which rests on a base 51 on which is mounted photoelectric means responsive to light from source 43—44. This means comprises two light responsive elements in the form of two photo-voltaic cathodes 52, 53 mounted in a single envelope 54 and connected in opposition as the input to an electronic amplifier connected thereto by means of cable 55. A pen recording instrument (not shown) is coupled to the amplifier. The light responsive elements are mounted on a plate 56 which slides in channel 57. A spring pressed follower 58 pushes the plate against a micrometer screw 59. The horizontal position of the light responsive elements is adjustable in a line perpendicular to the light tube axis by means of this micrometer slide. The cover 50 is secured to base 51 by screw 51a which passes through slot 50a in the side of the cover. The light tube 41 can be removed by loosening screw 51a and unscrewing coupling 42.

By separately mounting the light responsive means, the refractometer cell, and the light source on the supporting plate 10, the supporting structure is kept separate and independent of the functional part of the apparatus so that changes due to mechanical, thermal and other stresses on the supporting structure are not imparted to the functional elements.

Figure 4:
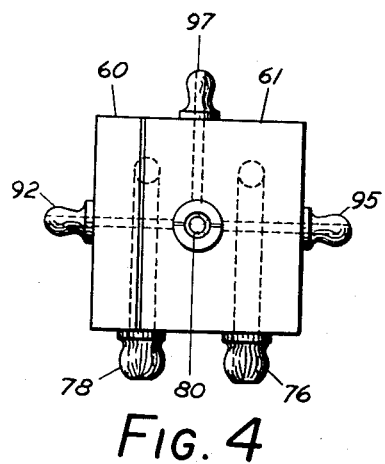
Figure 4 is a left end view of the refractometer cell.
Figure 5:
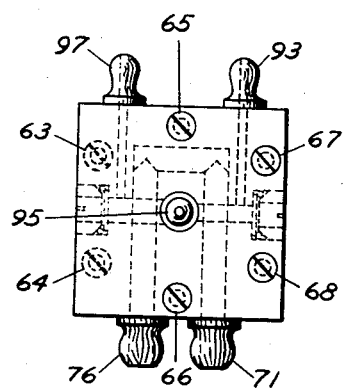
Figure 5 is a front elevation of the cell.
Figure 6:
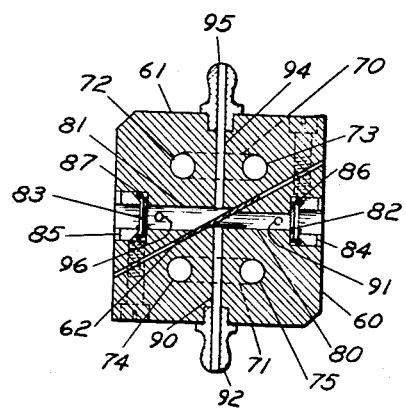
Figure 6 is a horizontal section through the middle of the cell looking upwardly.

Referring now also to Figures 4, 5, and 6, the refractometer cell 22 comprises a brass cube divided into two halves 60, 61 along a vertical plane disposed at a thirty degree angle to the axis of the light tubes. Between the two halves is disposed a thin glass plate 62. The two halves of the cube are held together with the glass plate clamped between them by means of six screws 63, 64, 65, 66, 67, 68.

Means to circulate a fluid such as oil or water through each half of the cell to maintain it at constant temperature is provided by horizontal passages 70 and 71 bored from one side and then plugged back. In communication therewith are vertical bores 72, 73, 74, 75 in the lower ends of which are screwed four couplings as shown at 76, 77, and 78. These couplings are adapted to be connected to hose made of flexible rubber-like material resistant to the fluid circulated therethrough to control the cell temperature. An opening through the plate 10 provides access through the bottom of frame 15 to the four hose couplings.

A light passage through the cell is provided by a smaller bore 80 in cell half 60 and a larger bore 81 in cell half 61. These bores are closed by glass plates 82 and 83 held in place by screw plugs 84 and 85 and sealed by O rings 86 and 87. Plugs 84 and 85 have conical ends to force the O rings against the bores as well as the plates.

Means to circulate fluid through the light passage in each half of the cell is provided. In the case of cell half 60 this means comprises horizontal bore 90 and vertical bore 91. A threaded pipe coupling 92 is screwed into a counterbore in half 60 around bore 90. A threaded pipe coupling 93 is screwed into half 60 around bore 91. In the case of half 61 there is a horizontal bore 94 around which is coupling 95 and a vertical bore 96 around which is coupling 97. The slots 16 and 17 in frame 15 provide access to house couplings 92 and 95 which extend therethrough.

Figure 3:
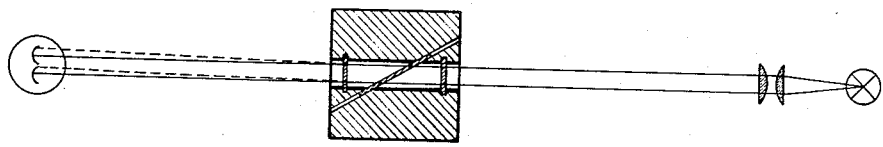
Figure 3 is a schematic view of the apparatus viewed from below showing the optical path.

In use of the apparatus, a fluid of known refractive index is used as a standard and is disposed in the part of the light passage in cell half 60. For continuous comparison the unknown fluid will flow through the cell half 60. The standard fluid may be left static or circulated. Oil or water or other fluid will be circulated through the courses 70, 71 to maintain the blocks at the desired temperature. As indicated in Figure 3, light from source 43—44 will pass through collimator 44, light tube 39, cell half 60, plate 62, cell half 61, light tube 41, and thence to the photometric means at the end thereof. In passing angularly through the interfaces between plate 62 and the fluids in the bores 80 and 81, the light will be refracted first in one direction and then in the other. If the refractive indices of the two fluids are the same, the light will be returned to its original direction, but if not it will enter tube 41 at an angle to the axis thereof. It is to care for such deviation that bore 81 is made larger than bore 80. The light will strike the photometric means so as to be more on one photo cathode than another thereby producing an unbalance in the electric circuit in one direction or the other which will be amplified and recorded.

The two part construction of the cell block with the parting faces each all in one plane makes it easy to fit the parts together. This is important because for precision work the instrument must be taken apart and cleaned at regular intervals and then put together again accurately to prevent leakage and light distortions due to misfits, strain in the glass plate, and curvature of the plate. The windows formed by glass plates 82 and 83 are also easily removable for cleaning and are easily and accurately replaceable. This is important because any deviation of the window glass from perpendicular to the light tube axis introduces a refractive effect which will cause error. Also, any leakage of the fluid may allow the entrance of air bubbles, dirt, and other disturbing media.

Since the response of the instrument depends in part on the angle of the plane of division of the two halves of the cell, the mounting of the cell so that it is removable makes it easy to substitute a different cell in the apparatus whenever desired. It also makes possible the substitution of a like cell while the original one is being cleaned, thereby making possible substantially continuous operation of the apparatus, which is important in monitoring, of chemical processes for example.

While a preferred embodiment of the invention has been shown and described many modifications thereof can be made by one skilled in the art without departing from the spirit of the invention and it is desired to protect by Letters Patent all forms of the invention falling within the scope of the following claims.

I claim:

1. A refractometer cell comprising an opaque body having the shape of a rectangular parallelepiped and divided into two halves along a single plane perpendicular to one pair of parallel faces of the parallelepiped and angularly disposed with respect to the other four faces thereof at an angle differing from ninety degrees and extending from the exterior of one of said other four faces near one edge thereof all the way to the exterior of the opposite face near the diagonally opposite edge, a plate of transparent material disposed between said halves, each of said body halves having a hole extending therethrough terminating at one end at said plate and at the opposite end on one of another pair of parallel faces of said parallelepiped, and transparent means closing the outer ends of said holes, the last said means and said holes and said plate providing a light passage through said cell parallel to said faces to which the dividing plane is perpendicular.

2. A refractometer cell comprising an opaque body having the shape of a rectangular parallelepiped and divided into two halves along a single plane perpendicular to one pair of parallel faces of the parallelepiped and angularly disposed with respect to the other four faces thereof at an angle differing from ninety degrees and extending from the exterior of one of said other four faces near one edge thereof all the way to the exterior of the opposite face near the diagonally opposite edge, a plate of transparent material disposed between said halves, each of said body halves having a hole extending therethrough terminating at one end at said plate and at the opposite end on one of another pair of parallel faces of said parallelepiped, and transparent means removably disposed entirely within each of said holes to close each hole at a position spaced outwardly from said plate, the last said means and said holes and said plate providing a light passage through said cell parallel to said faces to which the dividing plane is perpendicular.

3. A refractometer cell comprising an opaque body having the shape of a rectangular parallelepiped and divided into two halves along a single plane perpendicular to one pair of parallel faces of the parallelepiped and angularly disposed with respect to the other four faces thereof at an angle differing from ninety degrees and extending from the exterior of one of said other four faces near one edge thereof all the way to the exterior of the opposite face near the diagonally opposite edge, a plate of transparent material disposed between said halves, each of said body halves having a hole extending therethrough terminating at one end at said plate and at the opposite end on one of another pair of parallel faces of said parallelepiped, transparent means closing the outer ends of said holes, the last said means and said holes and said plate providing a light passage through said cell parallel to said faces to which the dividing plane is perpendicular, and releasable means to hold said halves of the body together with said plate clamped therebetween, the last said means being disposed entirely within the external surface of the parallelepiped.

4. A refractometer cell comprising an opaque body having the shape of a rectangular parallelepiped and divided into two halves along a single plane perpendicular to one pair of parallel faces of the parallelepiped and angularly disposed with respect to the other four faces thereof at an angle differing from ninety degrees and extending from the exterior of one of said other four faces near one edge thereof all the way to the exterior of the opposite face near the diagonally opposite edge, a plate of transparent material disposed between said halves, each of said body halves having a hole extending therethrough terminating at one end at said plate and at the opposite end on one of another pair of parallel faces of said parallelepiped, transparent means removably disposed entirely within each of said holes to close each hole at a position spaced outwardly from said plate, the last said means and said holes and said plate providing a light passage through said cell parallel to said faces to which the dividing plane is perpendicular, and releasable means to hold said halves of the body together with said plate clamped therebetween, the last said means being disposed entirely within the external surface of the parallelepiped, the edges of said parallelepiped perpendicular to the first said pair of parallel faces thereof and at the junctions of the face of each half in which terminates one of said holes with the adjacent face being bevelled.

References Cited in the file of this patent

UNITED STATES PATENTS

| Number | Name | Date |
|---|---|---|
| 454,989 | Sonden | June 30, 1891 |
| 548,495 | Abbe | Oct. 22, 1895 |
| 1,264,374 | De Florez | Apr. 30, 1918 |
| 1,939,088 | Styer | Dec. 12, 1933 |
| 2,056,791 | Logan | Oct. 6, 1936 |
| 2,083,778 | Forrest | June 15, 1937 |
| 2,413,208 | Barnes | Dec. 24, 1946 |
| 2,427,996 | Seaman | Sept. 23, 1947 |
| 2,445,044 | Stamm et al. | July 13, 1948 |
| 2,583,973 | Stamm et al. | Jan. 29, 1952 |

FOREIGN PATENTS

| Number | Country | Date |
|---|---|---|
| 667,896 | Great Britain | Mar. 12, 1952 |